United States Patent [19]

Buckley et al.

[11] Patent Number: 5,117,949
[45] Date of Patent: Jun. 2, 1992

[54] HIGH TORQUE BRAKE HAVING NO BACKING PLATE BRAKE PADS

[75] Inventors: James A. Buckley, Whitefish Bay; George H. Hinkens, Fox Point; James J. Dimsey, Brown Deer, all of Wis.

[73] Assignee: Hayes Industrial Brake, Inc., Mequon, Wis.

[21] Appl. No.: 585,993

[22] Filed: Sep. 21, 1990

[51] Int. Cl.⁵ ............... F16D 55/226; F16D 65/092
[52] U.S. Cl. .................... 188/73.31; 29/413; 29/414; 188/71.1; 188/73.1; 188/250 B; 188/259; 192/107 R
[58] Field of Search .......... 188/73.1, 73.31, 71.1, 188/250 B, 250 G, 250 H, 259; 192/107 R; 29/413, 414

[56] References Cited

U.S. PATENT DOCUMENTS

| | | | |
|---|---|---|---|
| 2,966,695 | 1/1961 | Dwyer | 29/413 X |
| 3,053,346 | 9/1962 | Butler | 188/73.31 X |
| 3,895,693 | 7/1975 | Lucien et al. | 188/71.1 |
| 4,030,185 | 6/1977 | Hahm et al. | 29/413 |
| 4,581,803 | 4/1986 | Blinks et al. | 29/416 X |
| 4,775,033 | 10/1988 | Heibel | 188/71.1 X |

FOREIGN PATENT DOCUMENTS

| | | | |
|---|---|---|---|
| 2100009 | 9/1921 | Fed. Rep. of Germany | 188/73.1 |
| 872224 | 6/1942 | France | 188/73.1 |
| 2446962 | 9/1980 | France | 188/73.1 |
| 333073 | 8/1930 | United Kingdom | 192/107 R |

Primary Examiner—George E. A. Halvosa
Attorney, Agent, or Firm—Foley & Lardner

[57] ABSTRACT

A caliper type brake for braking a brake disc including a caliper having a recess in the caliper on one side of the disc, a piston mounted in the caliper on the other side of the disc and including a recess, each recess having one or more ribs forming two or more cavities in each recess and a brake pad mounted in each recess, each brake pad being formed with a number of frangible portions, which break on engagement with the ribs to separate the brake pads into separate sections corresponding to the number of cavities in the recesses.

9 Claims, 4 Drawing Sheets

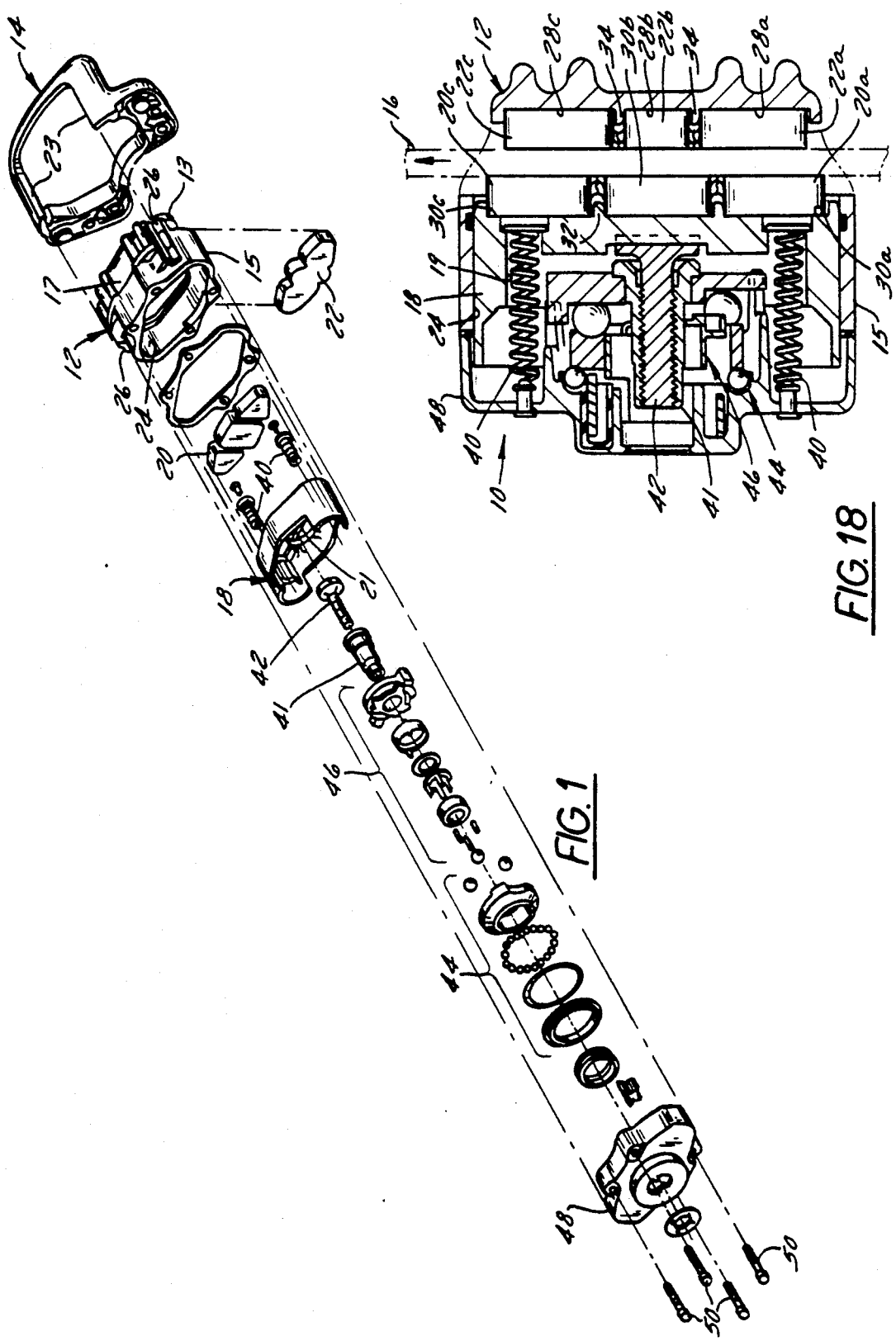

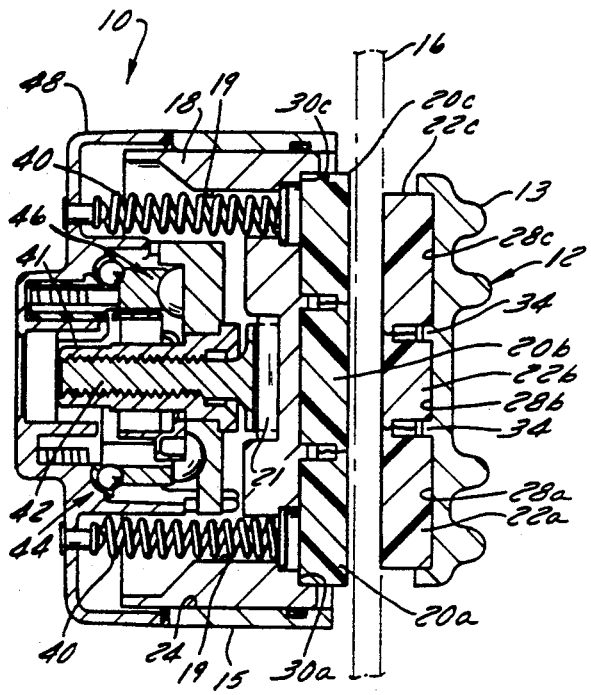
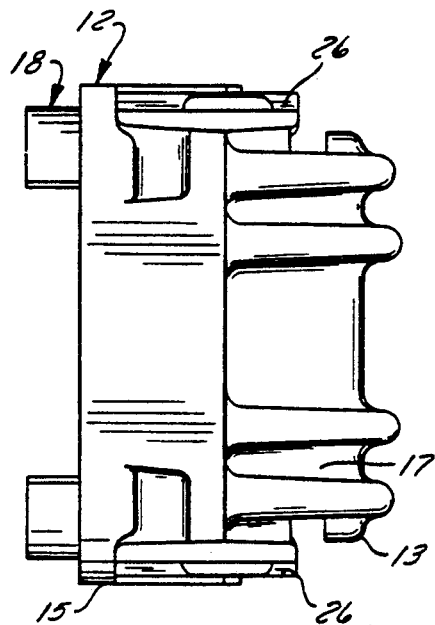
FIG. 5
FIG. 2
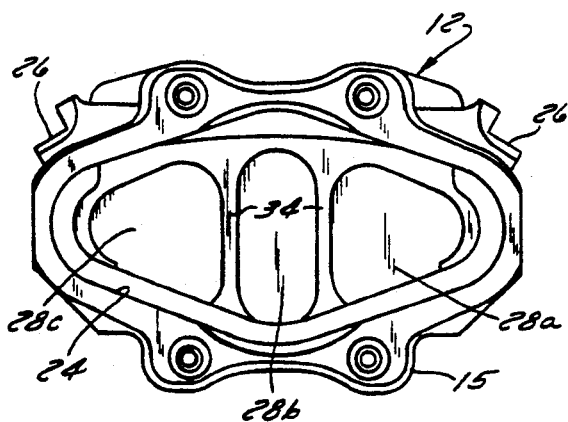
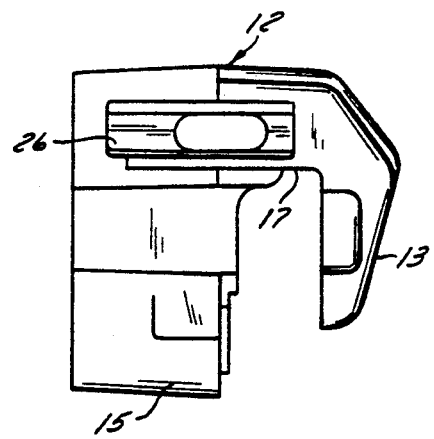
FIG. 3
FIG. 4

HIGH TORQUE BRAKE HAVING NO BACKING PLATE BRAKE PADS

FIELD OF THE INVENTION

The present invention relates to caliper type disc brakes and more specifically to unsupported multiple piece brake pads for high torque caliper brake applications.

BACKGROUND OF THE INVENTION

Brake pads conventionally are bonded to the surface of a backing plate or integrally molded upon the backing plate prior to mounting of the pads in the brake. When integrally molded the backing plate is provided with a multiplicity of recesses or apertures into which portions of the friction material are forced. After curing, these portions serve to resist shear forces between the pad and the backing plate during brake application. The strength of the brake pad is limited to the shear strength of the bonding material or the molded portions of the friction material.

In some low torque brake applications the brake pads are placed in recesses having side walls which extend partway up the sides of the brake pads. When the brakes are applied, the side walls of the recesses provide the only contact or holding force which prevents movement of the pad in the recess. Since this is only a small area of engagement a high shear force is imposed on the edge of the brake pad which is generally satisfactory for low torque applications. However, it has been found that under high torque applications, the side wall of the brake pad can shear off the bottom of the pad.

SUMMARY OF THE PRESENT INVENTION

The present invention relates to frangible type brake pads that are positioned in preformed recesses provided in both the caliper housing and the piston of a caliper brake. Each recess is provided with two ribs which separate each recess into three separate cavities. The brake pads are molded in one piece from conventional friction material having thin frangible sections which correspond to the location of the ribs in the recesses. The brake pads are positioned in the recesses with the ribs aligned with the frangible sections. When a brake force is applied to the brake pad, the frangible section will break the pad into three separate pieces. Each piece of the brake pad is then independently restrained in each cavity, thus increasing the brake pad shear area to the three areas of contact with the separate pads. With this arrangement, the shear area of the pad is increased over 200%, making it possible to operate in high torque applications.

One of the primary advantages of the invention is the reduced cost of manufacture of the brake pads due to the elimination of backing plates.

Another advantage is achieved by the separation of each brake pad into three separate pieces to thereby increase the overall shear area of each brake pad.

A further advantage of the present invention is the cost saving achieved by using a unicast housing and piston to support the brake pads.

A primary feature of the invention is the provision of brake pads of different configurations so that they cannot be improperly mounted in the brake recesses.

In accordance with another aspect of the invention, the brake pads can be mounted in the recess in one piece rather than in separate pieces reducing the handling time for assembling the brake.

Other principal features and advantages of the invention will become apparent to those skilled in the art upon review of the following drawings, the detailed description and the appended claims.

Another advantage is that the brake pads are inserted and subsequently break into three rather than having to separate pads at assembly.

DETAILED DESCRIPTION OF THE DRAWINGS

FIG. 1 is an exploded perspective view of a caliper brake assembly including a housing and a support rail.

FIG. 2 is a top view of the caliper brake housing.

FIG. 3 is a back view of the caliper brake housing with the piston removed.

FIG. 4 is a side elevation view of the caliper brake housing.

FIG. 5 is a cross-sectional view of the caliper brake assembly.

FIG. 18 is a view similar to FIG. 5 showing the brake pads seated on the disc with the frangible sections of the brake pads broken to form three separate brake pad pieces.

Figure 8:
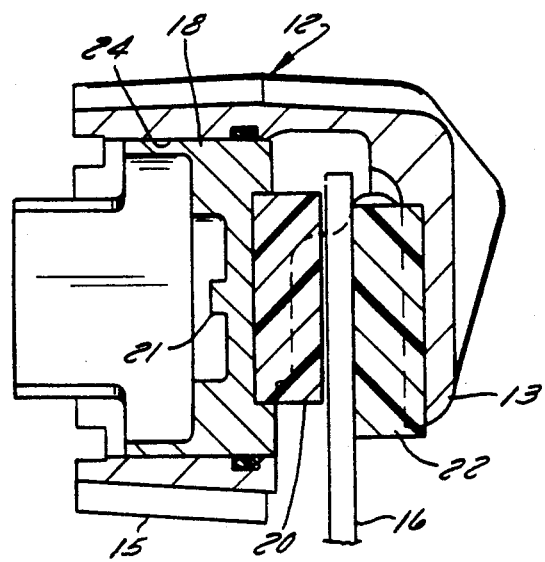
FIG. 8 is a side view partly in section of the caliper brake showing the brake pads positioned in the caliper brake recesses.
Figure 7:
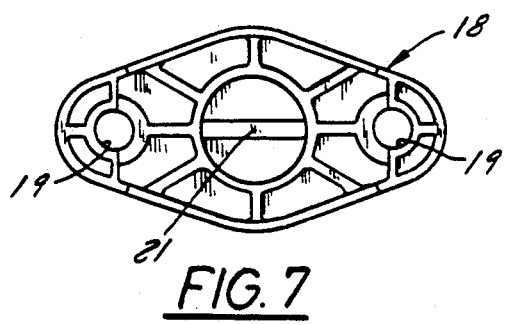
FIG. 7 is a back view of the piston shown in FIG. 6.
Figure 6:
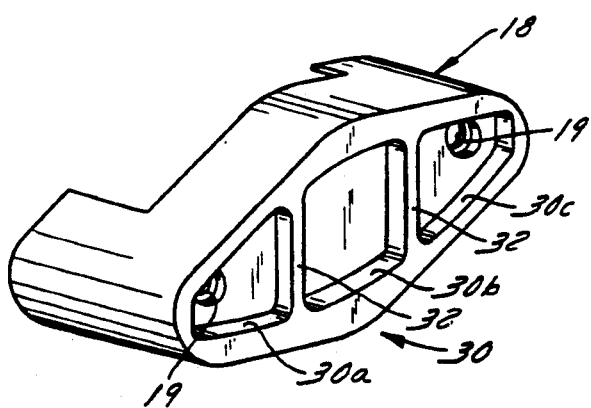
FIG. 6 is a perspective view of the piston for the caliper brake.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

The caliper disc brake 10 according to the present invention as shown in FIG. 1-5 generally includes a C-shaped caliper 12 which is mounted on a rail assembly 14 in a position to bridge a rotary disc 16. The caliper 12 includes a leg 13 on the outboard side of the disc 16 and a leg 15 on the inboard side of the disc 16. The legs are interconnected by a bridge section 17. The inboard leg 15 includes a piston 18 which is mounted for movement toward the back or inboard side of disc 16.

The piston 18 includes a pair of holes 19 on each side and a rib 21 in the back.

Brake pads 20 and 22 are positioned in the piston 18 and leg 13, respectively, in a position to engage the disc 16. A pair of rail guides 26 are provided on the sides of the bridge section 17 for supporting the caliper 12 for sliding movement on the rails 23 of rail assembly 14. As is generally understood, on movement of the piston 18 toward the disc 16, the pad 20 will engage the inboard side of the disc 16 causing the caliper 12 to move on the rails 23 in the opposite direction to move the pad 22 into engagement with the outboard side of disc 16.

The operating assembly of the caliper disc brake 10 is generally known and includes a set of springs 40 axially aligned in holes 19 for retracting the piston 18 and a thrust screw 42 which matingly engages the rib 21 for moving the piston 18 toward the disc 16. The thrust screw 42 is mounted in a threaded sheath 41 which is advanced by a ball and ramp assembly 44. A wear compensating assembly 46 is also provided for rotating the sheath 41 to adjust the stroke of the thrust screw 42 to compensate for wear of the brake pads 20 and 22. A cover 48 is secured to the caliper 12 by screws 50 to enclose the operating assembly.

Figure 9:
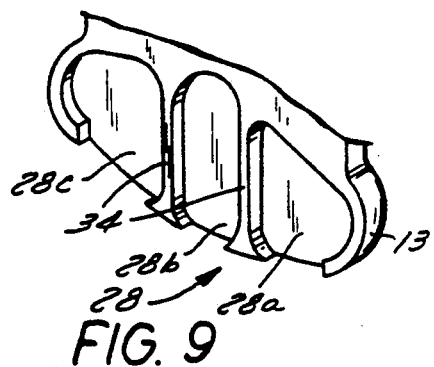
FIG. 9 is a perspective view of a portion of the caliper brake showing the recesses for the brake pad in the caliper housing.
Figure 10:
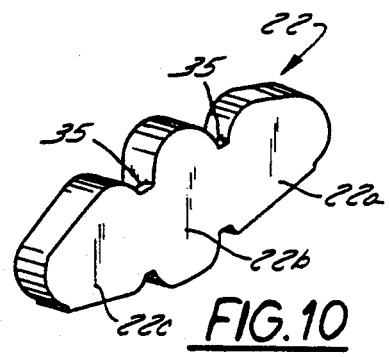
FIG. 10 is a perspective view of a brake pad for the carrier side of the caliper brake.
Figure 12:
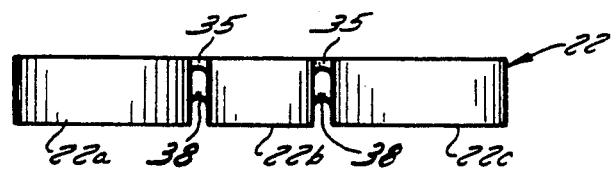
FIG. 12 is a top view of the brake pad carrier side.
Figure 13:
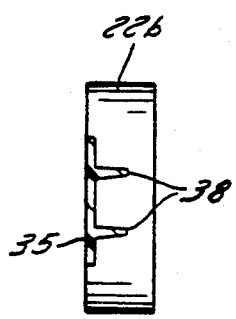
FIG. 13 is a cross-section view of the brake pad carrier side taken on line 13—13 of FIG. 11.
Figure 11:
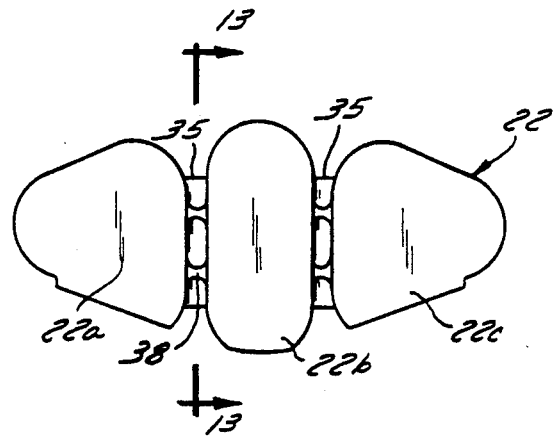
FIG. 11 is a front view of the brake pad side.
Figure 14:
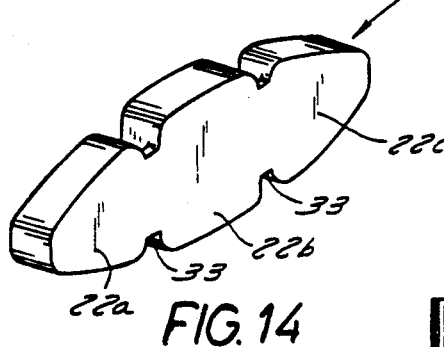
FIG. 14 is a perspective view of the brake pad piston side.
Figure 16:
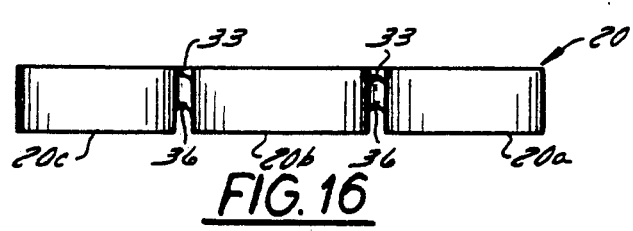
FIG. 16 is a top view of the brake pad piston side.
Figure 17:
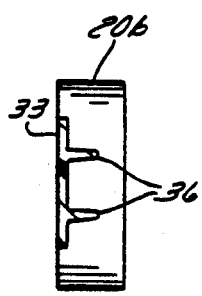
FIG. 17 is a cross-sectional view of the brake pad piston side taken on line 17—17 of FIG. 15.
Figure 15:
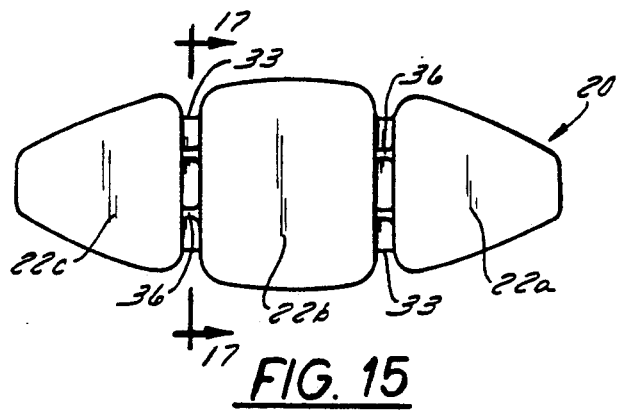
FIG. 15 is a front view of the brake pad piston side.

The caliper 12 is cast in one piece with a cylinder 24 provided in the inboard leg 15 and an elliptical shaped recess 28 is provided in the outboard leg 13. The recess 28 as shown in FIG. 9 is separated into three separate recesses or cavities 28a, 28b and 28c by ribs 34. The piston 18 is a die cast piece formed from a zinc alloy and having a generally elliptical shape. The piston 18 is positioned in the cylinder 24 for movement toward and away from the disc 16. A recess 30 is provided in the face of the piston which is separated into three separate recesses or cavities 30a, 30b and 30c by ribs 32. It should be noted that the center recesses 28b and 30b are of a generally rectangular shape and the outer recesses 28a, 28c and 30a, 30c are of a generally triangular shape.

The brake pads 20 and 22 as shown in FIGS. 10-15 are molded from a phenolic based organic material filled with a fiber material such as steel wool or fiber glass. The pads 20 and 22 can also be molded of sintered powdered metal. Each pad is molded in three sections 20a, 20b, 20c and 22a, 22b, 22c which are connected by thin frangible portions 33 and 35, respectively. Each of the frangible portions 33 and 35 of each pad is strengthened by a pair of ribs 36 and 38 which have a length approximately half the thickness of the pads. The ribs are provided to reinforce the frangible portions during normal handling and to localize the fracture. The frangible portions 33, 35 and ribs 36, 38 are designed to fracture in the first application of the brakes.

In this regard, each of the brake pads 20 and 22 is placed in the corresponding recesses 28 and 30, respectively, as a solid piece requiring less work than a segmented pad would. It should be noted that the brake pad 20 which is mounted in caliper recess 28 is not symmetrical and therefore can only be mounted one way in the recess. The brake pad 22 is symmetrical and can be placed in the piston recess 30 either way. With this arrangement, the brake pads can only be mounted in the correct recess. It should be noted that although the brake pad 20 is not symmetrical, it can be symmetrical if a lower volume pad is desired.

Once the brake pads 20 and 22 are mounted in their respective recesses and the brake is applied, the frictional torque introduced into the brake pads on application of the brakes will move the pads laterally in the recesses. Each individual section of each brake pad will move into engagement with the end of the recess or the corresponding rib. Due to the dimensional differences between the pads and the recesses, the frangible portions 33, 35 and ribs 36, 38 will fracture, separating the pads into independent sections.

Referring to FIG. 18, the disc 16 is shown moving in the direction of the arrow. Each of the pad sections 20a and 20b are shown bearing against the ribs 32 and the end section 20c bearing against the end wall of the recess 30c. A small clearance, which is exaggerated in the drawing, is shown between the pad sections 20c and 20b with ribs 32 and pad section 20a and end wall of recess 30a. This difference in dimension is sufficient to fracture the frangible portions. Each pad section will act as an independent brake pad thereby providing three separate shear areas for each of the brake pads thus increasing the shear area over 200%.

Thus, it should be apparent that there has been provided in accordance with the present invention a high torque brake having no backing plate on brake pad that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A disc brake for braking a rotating disc, said brake comprising:
   a caliper having a leg positioned on one side of the disc;
   a recess in said leg on said one side of said disc, said recess including one or more ribs separating said recess into two or more cavities;
   a piston mounted in said caliper on the other side of the disc, said piston including a recess having one or more ribs separating said recess into two or more cavities; and
   a brake pad mounted in each of said recesses, each brake pad including two or more sections connected by frangible portions, said brake pad sections having configurations corresponding to the configurations of said cavities in said recesses in said leg and said piston, whereby said frangible portions break on application of the brake such that each section acts independently to stop the rotation of the disc.

2. A disc brake according to claim 1 wherein said frangible portions include ribs in said frangible portions for connecting said sections.

3. The brake according to claim 2 wherein said brake pad for said piston is symmetrical and said brake pad for said caliper is not symmetrical.

4. A caliper disc brake comprising:
   a carrier bridging the brake disc;
   a recess in said carrier on one side of the brake disc;
   a piston mounted in said carrier on the other side of the disc, said piston including a recess and being movable toward the disc;
   a brake pad mounted in each of said recesses, each of said recesses including three cavities, each brake pad including three sections interconnected by frangible portions whereby said frangible portions will break each brake pad into three independent brake pad sections.

5. The brake according to claim 4 wherein said brake pad for said piston is symmetrical with respect to said recesses in said piston and said brake pad for said caliper is nonsymmetrical with respect to said recesses in said caliper.

6. In a disc brake having a rotatable disc with inboard and outboard frictional surfaces thereon, said brake including a caliper having an inboard leg and an outoard leg straddling said rotatable disc, said outboard leg including a recess disposed in close proximity to the outboard side of the disc and a piston mounted in said inboard leg for movement toward said inboard side of the disc, said piston including a recess disposed in close proximity to said inboard side of said disc, the improvement comprising a brake pad mounted in each of said recesses, each brake pad including a frangible portion dividing each of said brake pads into independent sections and wherein each of said recesses includes one or more cavities separated by ribs which provide bearing surfaces for said brake pad sections.

7. The disc brake according to claim 6 wherein each of said pads includes a number of independent sections, each section having an outer configuration corresponding to the configuration of the recesses formed by said ribs whereby each of said independent pad sections is independently supported in said recess.

8. The disc brake according to claim 7 wherein said pad in said piston recess is symmetrical and said pad in said outboard leg is not symmetrical.

9. The disc brake according to claim 7 wherein said independent sections of said brake pads are interconnected by means of frangible portions formed integrally with said pads.

* * * * *